March 13, 1951  A. O. C. NIER  2,544,717
MASS SPECTROMETER APPARATUS
Filed Oct. 31, 1947  2 Sheets-Sheet 1

INVENTOR.
ALFRED O. C. NIER
BY
Paul, Paul & Moore
ATTORNEYS

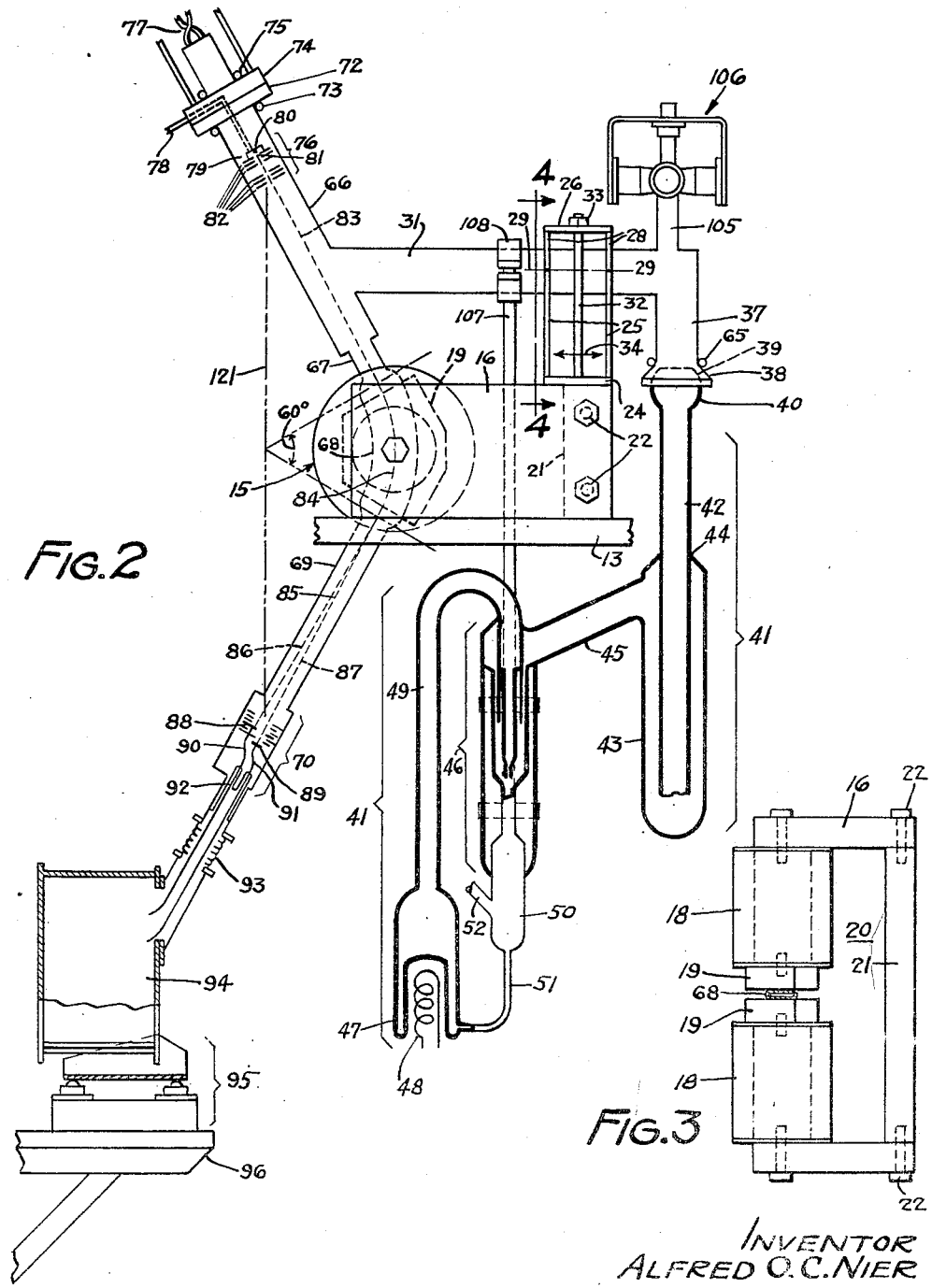

Patented Mar. 13, 1951

2,544,717

UNITED STATES PATENT OFFICE 2,544,717

MASS SPECTROMETER APPARATUS

Alfred O. C. Nier, Minneapolis, Minn., assignor to Regents of the University of Minnesota, Minneapolis, Minn., a corporation of Minnesota Application October 31, 1947, Serial No. 783,434

8 Claims. (Cl. 250—41.9)

This invention relates to mass spectrometers and particularly to improvements capable of facilitating the use of such instruments and lowering their cost of construction. In general it may be stated that a mass spectrometer consists of a highly evacuated vessel having an electron source that is utilized for charging atoms or molecules so that they exist within the vessel as ions. The evacuated vessel is so constructed that it presents a path of travel for the ions, which are accelerated by a suitable potential gradient so that they travel along said path and collectively constitute an electric current. The path of travel includes a certain section which is through a strong magnetic field which serves to deflect the moving ions to a degree depending upon their masses and the strength of the magnetic field, whereupon after further travel they are collected and the ion current which they represent is measured or otherwise utilized.

In instruments of this character it is essential for proper functioning accurately to adjust the ion current path with reference to the magnetic field. In prior instruments of this character this adjustment has been achieved by mounting the magnet so that it may be moved, but to do so has been difficult because of the heavy weight of the magnet and the degree of accuracy required.

It is an object of the present invention to provide an improved mass spectrometer wherein the adjustment of the ion path relative to the magnetic arrangement of the instrument is conveniently effected, and to provide an instrument in which the magnet is permanently located, and the remaining components mounted for movement relative thereto.

It is also an object to provide an improved mode of construction for mass spectrometers wherein the magnet is immovable and forms the locus of mounting for the evacuated ion tube which is made so that its position may be adjusted easily and conveniently with reference to the magnet.

It is also an object of the invention to provide an improved mass spectrometer of simple construction, easily built at low cost and of economical maintenance.

Other and further objects of the invention are those inherent in the apparatus herein illustrated, described and claimed.

The invention is illustrated with reference to the drawings in which

Figure 2 is a somewhat enlarged, partially schematic side elevational view of portions of the apparatus which are separated from the remaining components of the system in order to show the details more clearly;

Figure 3 is a fragmentary horizontal sectional view taken in the direction of arrows 3—3 of Figure 1.

Throughout the drawings corresponding numerals refer to the same parts.

Figure 1:
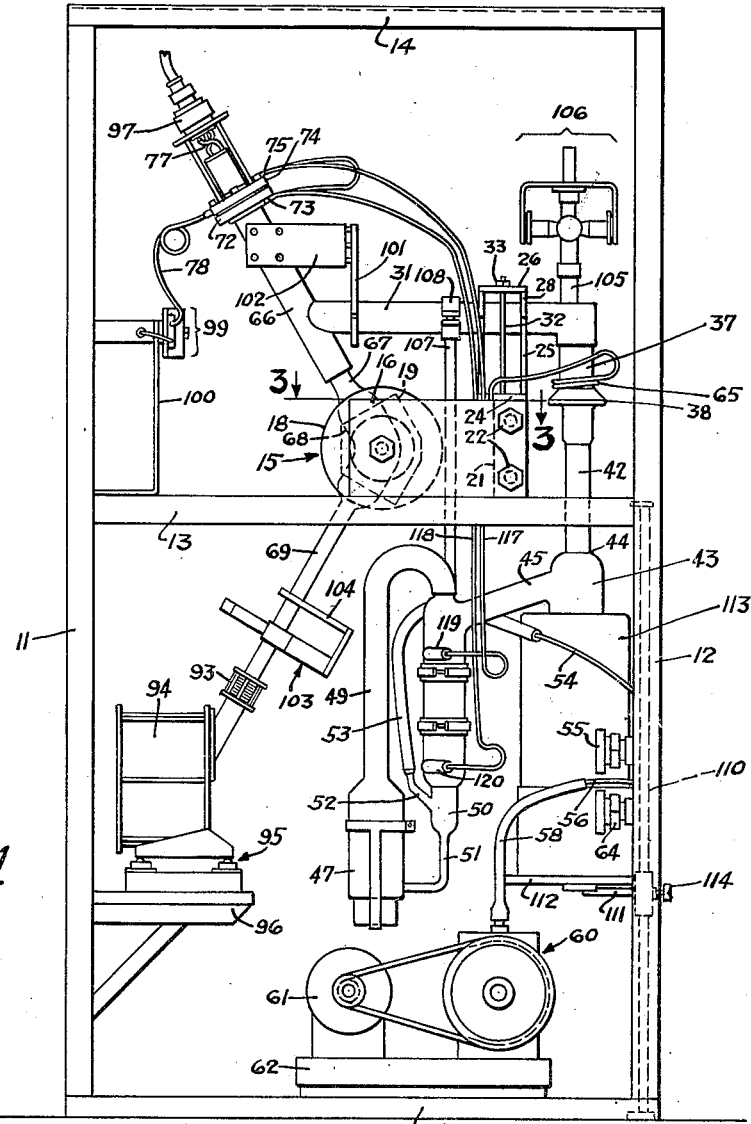
Figure 1 is a side elevational view of a mass spectrometer constructed in accordance with the invention.

Referring to the drawings, Figure 1 particularly, the apparatus comprises a main frame which may conveniently be composed of angle irons. The frame has a floor angle 10, posts 11 and 12 and intermediate frame member 13 and top frame member 14. Upon the intermediate frame member there is mounted the magnet assembly generally designated 15 which may be either an electromagnet as illustrated or a permanent magnet. In any event the magnet 15 is an exceedingly heavy part of the apparatus and is mounted directly upon the frame members 13 in fixed position on the frame. The magnet 15 illustrated has a core 16 and winding 18. The core has an air gap which is defined by pole pieces having the configuration shown by the dotted line 19. The core, which is U-shaped in plan view, has an interior opening 20 between the legs of the U and between the coil and the rear core connection 21 through which some of the supporting bracket structure passes, as hereinafter defined. The entire core structure is assembled by means of the heavy bolts 22 and is fastened to the frame by fastening devices so as to be fixed on the frame.

Figure 4:
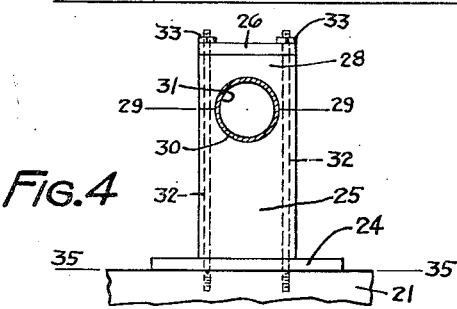
Figure 4 is a fragmentary vertical sectional view taken in the direction of arrows 4—4 of Figure 2.

Upon the upper surface of the core there is provided a bracket 24 of open box formation having upwardly extending supports 25. The bracket has a cap portion 26 which is provided with matching downwardly extending legs 28 which meet the upwardly extending supports 25 at the separating line 29—29. The portions 25—25 and 28—28 are provided with a circular aperture 30, as shown in Figure 4, through which the tubular connection 31 of the evacuatable system is adapted to pass. The two portions 24 and 26 of the bracket are held in clamping relation by studs 32 which are tapped into the upper surface of the magnet core 21. The studs are provided with nuts at 33 which when pulled down exert a clamping pressure upon the tubular connection 31. By loosening the nuts 33 the tubular connection may be moved back and forth in the direction of the double arrow 34 and to a limited extent the bracket 24—26 may be rotated so as to exert a slight rotary motion on the evacuatable assembly for adjustment as hereinafter described. In addition, by inserting or removing shims between the lower surface of the bracket 24 and the upper surface of the core 21 at the level 35, it is possible to raise and lower the evacuatable assembly slight amounts for adjustment purposes.

The evacuatable assembly consists of a tubular cross connection 31 which is provided at its right end, as shown in the drawings, with a downwardly extending branch 37 which terminates in the flange 38. The under side of the flange 38 is ground so as to provide a spherical seat at 39 which fits the spherical connection 40 of the glass mercury diffusion pump apparatus shown generally opposite the bracket 41. The diffusion pump includes a vertical outlet tube 42 which leads downwardly into the moisture freezing trap bulb 43 to which it is sealed at 44. From the trap 43 there is a side arm 45 extending to the mercury vapor pump section at 46. The mercury vapor pump is provided from the mercury boiler 47 which is heated by an electrical heating element 48, the vaporized mercury passing upwardly through the tube 49 and thence to the pumping section 46 where the pumping action takes place and the mercury is incidentally condensed to liquid form which returns from the bulb 50 and thence via pipe 51 to the mercury boiler 47. The gases and vapors withdrawn by the mercury pump are delivered at the outlet tube 52 which is connected by a flexible rubber hose or other flexible lead 53 to the pipe 54, Figure 1, which leads through the control valve 55 and line 56, flexible connection 58 to the fore-pump 60 which can be of any suitable variety and driven by motor 61 mounted upon the bed plate 62 that is in turn mounted upon the main frame members 10. Valve 64 provides for breaking the vacuum when desired and valve 55 for closing off line 54.

The seal of the spherical connection between the glass ball 40 and the metallic spherical seat 39 is made by coating the members with ordinary red sealing wax which is heated and the two parts pushed firmly together, after which they are permitted to cool. A cooling coil 65 is soldered to the metallic flange 38 for cooling the flange during gasing out operations, hereinafter described, so as to prevent damage to the seal.

At its left end, as shown in the drawings, Figures 1 and 2, the tubular cross connection 31 is joined to the mass spectrometer tube which includes an upper straight tubular section 66 of circular cross section which is reduced slightly at 67 and joined to the segmental curved tubular section 68 which is in turn connected to the straight tubular section 69 terminated in the ion collector 70. The curved segmental portion 68 is flattened in cross section so as efficiently to occupy the space between the pole faces 19. At the upper end of the straight section 66 there is a flange 72 which is arranged to be cooled by the soldered-on cooling pipe 73. To the flange 70 there is connected a mating flange 74 which is held by suitable clamping bolts. Flange 74 is likewise arranged to be cooled by the soldered-on cooling coil 75. Upon tne flange 74 there is mounted the entire ion source assembly shown opposite the bracket 76 which is suitably mounted and connected to the incoming leads 77 that are in turn connected to the separable coupling 91. The ion source and its construction forms the subject matter of my application Serial No. 783,433, filed October 31, 1947, now Patent No. 2,490,278 dated December 6, 1949, wherein it is claimed. To the flange 74 there is also connected the inlet pipe 78 which extends, as illustrated in Figure 2, into the interior of the ion source delivering into the chamber 79 containing the electron emitter filament 80. The sample undergoing analysis is introduced via tube 78 and is thus delivered into the region of the electron emitting filament 80 where due to electron emission the sample becomes ionized. The ionized sample is withdrawn from the chamber 79 through the slit 81 by a system of potential gradient plates 82. The plates 82 serve not only to accelerate the ionized sample, but also to focus it in a beam of ions which passes in the direction of the dotted line 83, thence downwardly along the tube portion 66 until it enters into the strong magnetic field defined by the pole pieces 19. The ionized particles of the sample behave as an electric current and are deflected by the magnetic field along the curved path 84 in an amount depending upon the strength of the magnetic field, the velocity of the particles and their mass. The velocity is maintained constant or as nearly constant as possible, and since the same magnetic field is common to all of the ionized particles, the amount of deflection occasioned by their passage through the strong magnetic field is, therefore, dependent upon the mass of the particles. Consequently, the stream of ionized particles after having passed through the magnetic field emerges as a spectrum 85, the lighter ionized particles being deflected most, as exemplified by the dotted line 86, and heavier particles deflected least, as exemplified by the dotted line 87. The particles are caught upon separate ion collecting plates 88 and 89 of the ion collector mechanism 70 where they give up their charges to the plates. The charges upon plates 88 and 89 constitute the effective signal and these are communicated by leads 90 and 91 which pass out through the glass squash 92 and thence through the flexible (Sylphon bellows) housing 93 to separate pre-amplifiers in the common pre-amplifier chamber 94 which is cushion-mounted by means of the mounting 95 that rests upon the bracket 96 attached to the frame members 11.

Referring to Figure 1, particularly, the inlet tube 78 by which the sample is introduced into the mass spectrometer mechanism passes through a sampling orifice 99 which is described and claimed in my application Serial No. 783,431 filed October 31, 1947, and, per se, forms no part of the present invention, the sample being supplied at a suitable container mechanism held in the framework 100.

Various adjuncts of the mass spectrometer tube include the framework 101 which is mounted upon the tubular cross connection 31, as shown in Figure 1. Element 101 has been eliminated in Figure 2 for purposes of clarity. The framework 101 which is suitably adjustable upon tube 31 serves in turn adjustably to support the frame 102 which is of horse shoe configuration in bracing the tube 66, the horse shoe frame 102 carries permanent focusing magnets. A further focusing magnet assembly is illustrated at 103, this being carried upon the frame 104 which likewise is adjustably mounted upon the tube 69. At the right end of the tubular connection 31 there is a branch 105 which extends to the Phillips gauge mechanism 106, which, per se, forms no part of the present invention. The Phillips gauge mechanism is a very sensitive pressure measuring device operating on the electron bombardment principle.

Extending downwardly from the tubular cross connection 31 there is an interior support brace rod 107 which is clamped to the tubular connection by means of the clamping bracket 108. The brace rod 107 extends down between the spaced legs of the large magnet 15 and is connected at its lower end to the mercury diffusion pump mechanism 41 so as to support it.

Upon the rear of the main frame there is a vertical bracket rod 110 upon which there is adjustably mounted the side arm bracket 111 supporting the plate 112. The plate 112 serves to carry an open top Dewar flask 113 into which the bulb 43 of the freezing trap in the mercury diffusion pump is adapted to be immersed. The brace 111 may be loosened by unscrewing the wing nut 114 so as to permit lowering of the Dewar flask 113 for replenishing the liquid air supply therein and by the same adjustment the Dewar flask may be positioned so that the bulb 43 is submerged into the flask and yet not in contact with it.

For the most part the mass spectrometer tube is composed of an alloy such as Inconel (trademark) or other suitable high temperature alloy. Thus, the tubular cross connection 31 and the ion path tube consisting of branches 66, 67, 68 and 69, the flanges 72 and 74 and the metallic portions of the ion collector mechanism 70, as well as the branch 37 leading to the mercury diffusion pump and the branch 105 leading to the Phillips gauge are all made of such alloy. In placing the apparatus in operation it is necessary to degas it by heating these metallic parts, and yet certain areas of the apparatus must not be heated beyond prescribed temperatures, otherwise gaskets, etc. will be deteriorated. In order to provide local cooling, cooling water tubes are soldered on at the prescribed places. Thus, a cooling water tube 65 is soldered onto the flange 38, thus chilling it while the adjacent portions are heated, thus preventing the softening of the red sealing wax by which the joint 39—40 is sealed. Cooling water tubes are also soldered onto the flanges 72 and 74 as indicated at 73 and 75. All the cooling water tubes are connected in series or parallel, as desired. Other cooling water tubes 117 and 118 extend down to the mercury diffusion pump connections 119 and 120, respectively.

It will be observed that in the described structure the entire mass spectrometer tube, including the mercury diffusion pump for evacuating the spectrometer tube, and all adjuncts of the tube are mounted upon evacuatable assembly which is in turn carried on the bracket 24—26. Thus, the cross connection 31 of the evacuatable assembly has at its right end the downwardly extending branch which consists of the mercury diffusion pump which hangs as a pendulous mass at the right end, being partly supported through the connection 37 and partly through the brace rod 107. At the left end of the tube 31, as shown in the drawings, there is the ion path defined by the tubes 66—69 having at the upper end the ion source assembly 76 and its appropriate connections and adjuncts and at the lower end the ion collector 70. In addition, all the adjuncts, including the focusing magnet assemblies 102, 103 and the Phillips gauge 106 are mounted upon the evacuatable assembly and are supported through it upon the brackets 24—26. Consequently, by loosening the bracket 24—26 it is possible to shift the entire evacuatable assembly with reference to the magnet 15 and thus obtain precision adjustment of the ion beam 83 with reference to the pole pieces 19. It will be noted that the pole pieces 19 define a segment of sixty degrees and that the ion source 76 and ion collector 70 are aligned as indicated at 121. The focusing and adjustment are critical, and for best results may in the present apparatus be made by a single simple adjustment, whereas heretofore the adjustment has had to be made by movement of the heavy magnet 15, a cumbersome adjustment at best.

In the illustrated form of the invention the pre-amplifier 94 is mounted on the frame 11 and connected to the mass spectrometer tube at the flexible connection 93 which permits movement of the tube relative to the pre-amplifier case 94. If desired, however, the pre-amplifier may be constructed of light weight materials and hung on the lower end of the tube 69 adjacent the ion collector plates. Likewise, if desired, the forepump 60 and its drive motor may be hung from the brace rod 107 which may also support the plate 112 for supporting the Dewar flask 113 of the freezing trap.

If the mass spectrometer tube is made movable and the high vacuum pump stationary so as to allow the mass spectrometer tube to be moved without moving the pump, this involves the provision of a flexible high vacuum connection between the two elements. While connections of this kind can be made by employing Sylphon bellows, they are never completely satisfactory. A Sylphon bellows has a great deal of surface area and hence is difficult to gas out satisfactorily. Moreover, they are subject to vacuum leaks.

As many apparently widely different embodiments of this invention may be made without departing from the spirit and scope thereof, it is to be understood that I do not limit myself to the specific embodiments herein except as defined by the appended claims.

What I claim is:

1. A mass spectrometer comprising a frame, a magnet fixedly mounted on the frame, said magnet having spaced pole faces, an evacuatable system, said system having a tubular cross connection above the magnet extending in a generally horizontal direction, said cross connection having connected therewith at each end generally upright portions, the portion at one end being a vacuum pump and the portion at the other end being an ion path having unaligned straight portions connected end to end by a curved segment and an adjustable supporting means for said evacuatable system providing for adjustably positioning said system as a unit with reference to the frame for adjusting the curved segment of ion path with reference to the magnet pole faces.

2. The apparatus of claim 1 further characterized in that bulk of the ion path and vacuum pump portions of the evacuatable system is below the cross connection so as to form, with the cross connection, a pendulus mass.

3. The apparatus of claim 1 further characterized in that said adjustable supporting means comprises a mounting bracket attached to the magnet.

4. The apparatus of claim 1 further characterized in that the unaligned straight portions and curved segment of the ion path, the cross connection and the vacuum pump portion are all situated in substantially the same plane.

5. A mass spectrometer having a frame, a massive magnet fixedly mounted on the midportion of the frame, said magnet having fixed pole faces and an avacuatable assembly having a generally upright mercury diffusion pump connected adjacent its upper end to one end of a transverse tubular connection of the evacuatable assembly, an ion path tube connected to the other end of the transverse tubular connection, said ion path tube comprising an ion source having an ion beam forming portions joined to a downwardly extending upper straight section connected by a curved segment to a second downwardly extending portion which is not aligned with upper straight section, said second downwardly extending portion terminating in an ion collector, the entire evacuatable assembly being a unit, means mounting said unit on the frame for adjustment movement with reference to the frame for positioning the curved section between the magnet pole faces, a fore-pump, auxiliary appliances mounted on the frame, and flexible connections between the fore-pump and the diffusion pump of the evacuatable assembly and between the auxiliary appliances and respective cooperating elements of the evacuatable assembly.

6. The apparatus of claim 5 further characterized in that the auxiliary appliances includes a pre-amplifier which is mounted on the evacuatable assembly for movement therewith.

7. The apparatus of claim 5 further characterized in that the auxiliary appliances includes a pre-amplifier, means mounting it on the frame and a flexible connection between said pre-amplifier and the ion collector.

8. The apparatus of claim 5 further characterized in that the evacuatable system includes a downwardly extending bulb adjacent the diffusion pump and includes a mounting on the frame for adjustably positioning a Dewar flask with said bulb extending thereinto.

ALFRED O. C. NIER.

REFERENCES CITED

The following references are of record in the file of this patent:

Nier: Review of Scientific Instruments, July 1940, vol. 11, pages 212–216.